(12) United States Patent
Kirsch

(10) Patent No.: US 9,691,025 B2
(45) Date of Patent: Jun. 27, 2017

(54) MACHINE OPERATION CLASSIFIER

(71) Applicant: Caterpillar Inc., Peoria, IL (US)

(72) Inventor: Karl Kirsch, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 352 days.

(21) Appl. No.: 14/487,857

(22) Filed: Sep. 16, 2014

(65) Prior Publication Data

US 2016/0078340 A1     Mar. 17, 2016

(51) Int. Cl.
| | | |
|---|---|---|
| G06N 99/00 | (2010.01) | |
| G06N 5/02 | (2006.01) | |
| E02F 9/26 | (2006.01) | |
| G07C 5/08 | (2006.01) | |

(52) U.S. Cl.
CPC ............. G06N 5/022 (2013.01); E02F 9/264 (2013.01); E02F 9/267 (2013.01); G06N 99/00 (2013.01); G06N 99/005 (2013.01); G07C 5/08 (2013.01)

(58) Field of Classification Search
CPC ........................................................ G06N 99/00
See application file for complete search history.

(56) References Cited

U.S. PATENT DOCUMENTS

| | | | |
|---|---|---|---|
| 3,643,828 A * | 2/1972 | Elliott | F15B 21/08 414/347 |
| 6,704,012 B1 * | 3/2004 | Lefave | G06F 11/323 345/440 |
| 7,487,066 B2 | 2/2009 | Sundermeyer et al. | |
| 8,374,987 B2 | 2/2013 | Weber et al. | |
| 8,527,452 B2 | 9/2013 | Klinger et al. | |
| 2008/0270074 A1 | 10/2008 | Horkavi et al. | |
| 2010/0100338 A1 | 4/2010 | Vik et al. | |
| 2012/0041910 A1 | 2/2012 | Ludik et al. | |
| 2012/0150773 A1 * | 6/2012 | DiCorpo | G06N 99/005 706/12 |
| 2014/0224888 A1 | 8/2014 | Bomer et al. | |

FOREIGN PATENT DOCUMENTS

| | | |
|---|---|---|
| EP | 2530209 | 12/2012 |
| JP | 2014112329 | 6/2014 |
| WO | 2014080793 | 5/2014 |

OTHER PUBLICATIONS

S. Russell and P. Norvig, Artificial Intelligence: A Modern Approach, 2nd Ed., 2003, pp. 375-461, and 649-946.*

* cited by examiner

Primary Examiner — Vincent Gonzales

(57) ABSTRACT

A process for developing machine classification systems includes using human experts to associate expected operations with various machine states including drawbar pull, tool position, tool commands, gear, and ground speed, among others, to create a classification system that can be used in a particular machine. The classification system operates in real time to infer operations such as dig, dump, travel, and push from machine state inputs and logs the operations for use in operational analysis and maintenance of the machine.

10 Claims, 7 Drawing Sheets

MACHINE OPERATION CLASSIFIER

TECHNICAL FIELD

The present disclosure relates generally to developing a system that uses raw machine data to classify operations of a machine, such as a bulldozer, loader, excavator, etc.

BACKGROUND

It is useful to know what operations a machine is performing for many reasons, including scheduling preventive maintenance, providing operator training, and suggesting supplemental equipment purchases, to name a few. However, short of asking an operator to specifically log every operation, which is impractical, machines used for construction, mining, logging, and others functions, do not report their activities, only the state of the machine.

U.S. Publication 2102041910 (the '910 publication) discloses a method of establishing a process decision support system that combines expert analysis and operational data to be determined if a given process is good or bad. The '910 publication fails to teach developing an operation classifier that determines a current operation of a machine based on expected operations of the machine and associated machine states.

SUMMARY

In an aspect of the disclosure, a method of developing a machine operation classifier includes i) identifying, via a user interface of a computer, an operation of a machine, ii) compiling, at the computer, a list of conditions that are associated with the operation of the machine, and repeating, at the computer, steps i and ii for one or more operations that the machine is expected to perform. The method may also include generating, via the computer, a classifier algorithm, wherein the classifier algorithm outputs the operation of the machine selected from the identified operations of the machine in response to identification of conditions in the associated list of conditions when the classifier algorithm is executed on a processor of the machine. The operation of the machine may includes the operation of one of a construction machine, a mining machine, or an earthmoving machine.

In another aspect of the disclosure, a method of creating an operation classification algorithm for a machine may include developing a catalog of operations performed by the machine, cataloging events associated with each of the operations, wherein the events include tool events, direction events, gear events, and load/power events and for each event, document one or more machine conditions associated with the event. The method may include, for each machine condition, developing a calculation used to determine the one or more conditions from one of a current machine state or a combination of current and previous machine states. The method may continue by generating a classification algorithm that monitors the one or more machine conditions and outputs a current operation of the machine using the one or more conditions to identity events associated with the operation.

In yet another aspect of the disclosure, a computer for creating a classification algorithm for a machine may include a processor, a user interface coupled to the processor, and a memory storing instructions for execution on the processor. When the instructions are executed on the processor, the computer may receive, via the user interface, information about the machine. The information may include a catalog of operations performed by the machine, one or more events associated with each of the operations, and information for determining when each of the one or more of events has occurred. Further instructions may be executed by the processor that cause the computer to generate the classification algorithm that determines when one or more events has occurred in the machine and matches the one or more events to an operation from the catalog of operations.

These and other benefits will become apparent from the specification, the drawings and the claims.

DESCRIPTION

A machine operation classifier observes characteristics of the operation of a machine and decides what operation is being performed. The classifier then logs the operations for later use in analyzing performance, operator training, maintenance scheduling, and more. However, the development of the operation classifier is complicated. Dozens of measurements are available from the machine, from direct measurements such as engine RPM and hydraulic cylinder pressures, to indirect measurements such as drawbar pull or tool position.

Figure 1:
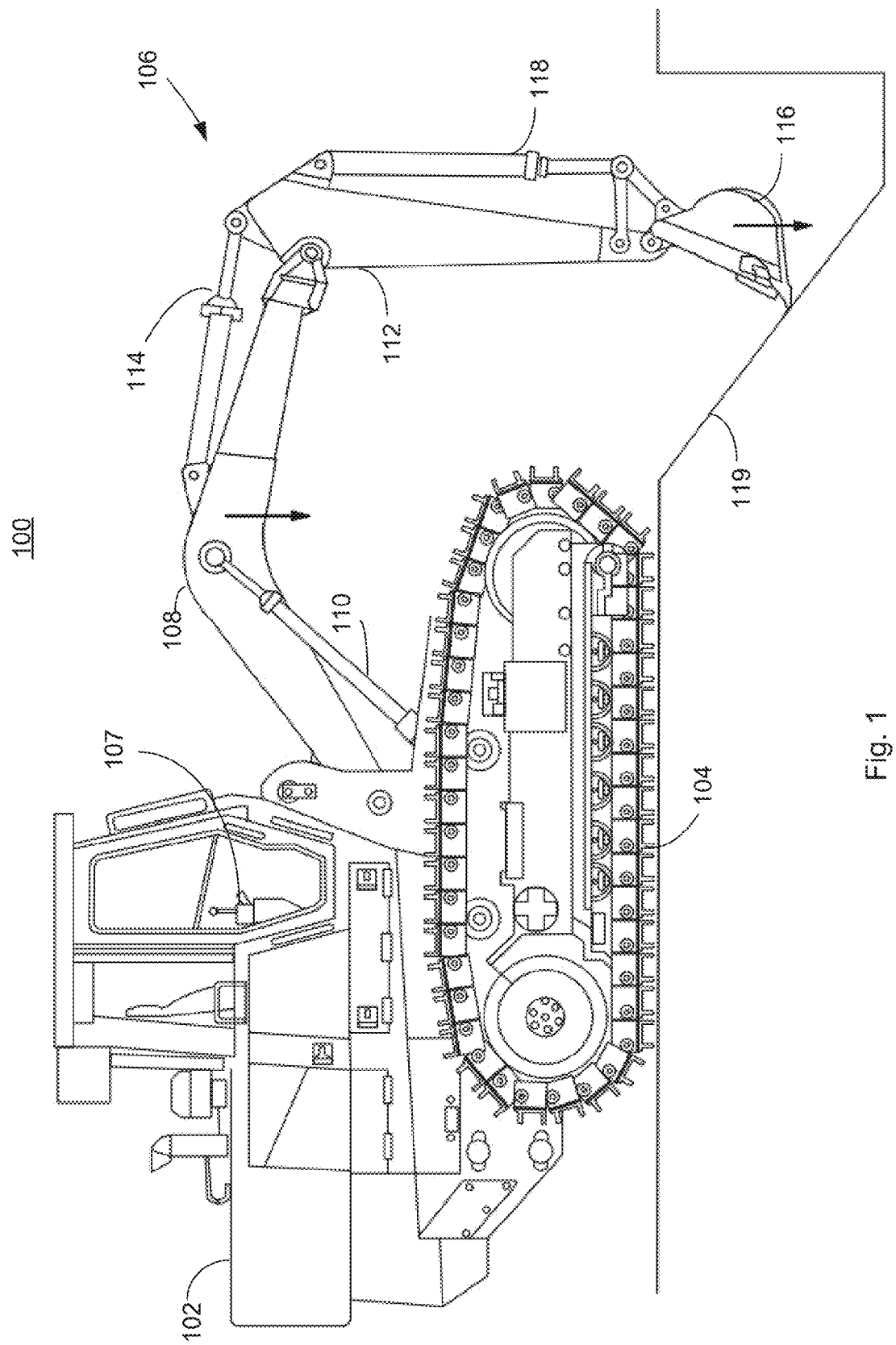
FIG. 1 is an illustration of a first off-road machine.
Figure 2:
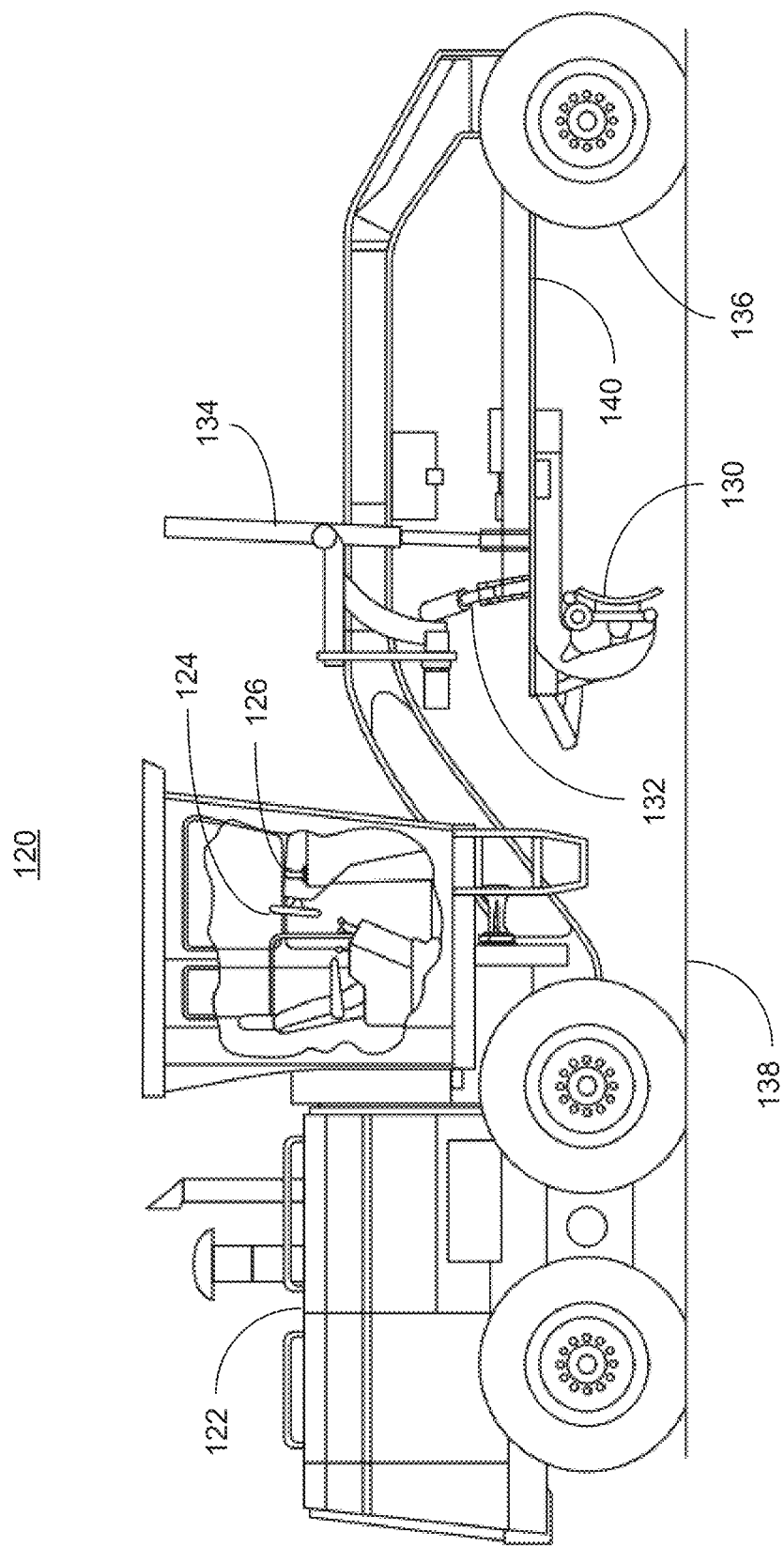
FIG. 2 is an illustration of a second off-road machine.
Figure 3:
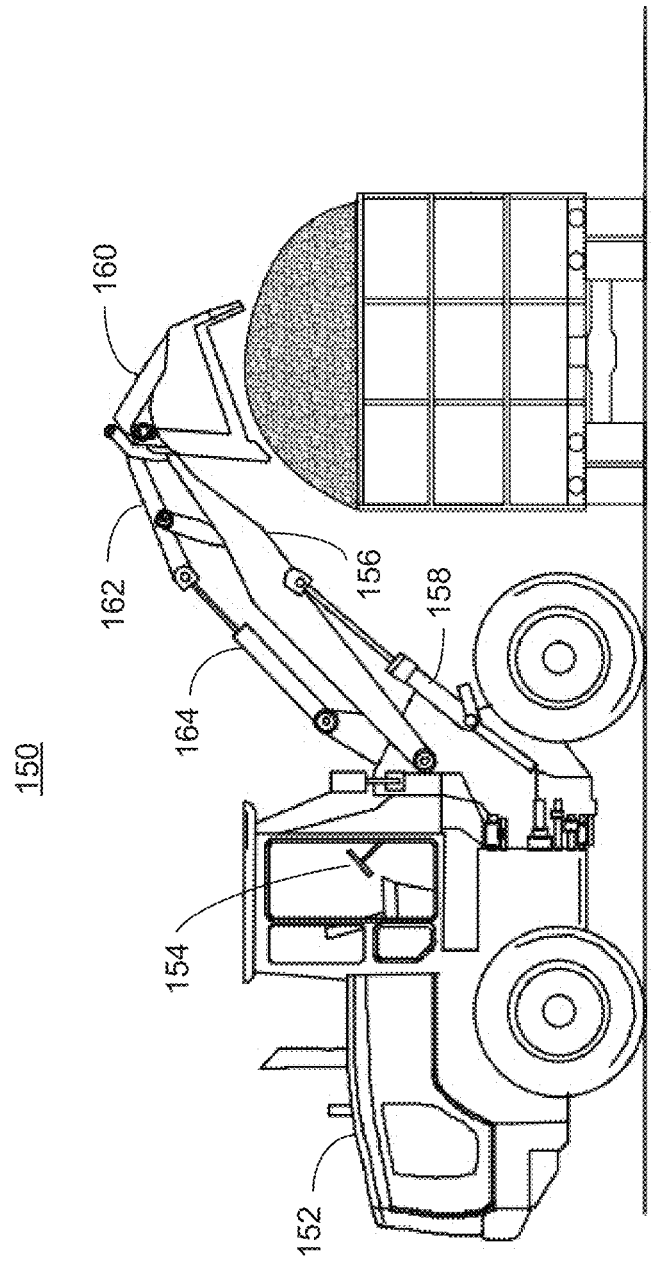
FIG. 3 is an illustration of a third off-road machine.

FIGS. 1-3 illustrate different machines with exemplary operations that each perform and some of the characteristics that may be observed to determine an operation.

FIG. 1 is an illustration of an off-road machine, specifically, an excavator 100. The excavator 100 may have an engine 102, tracks 104 or wheels for propulsion, and an implement 106 for use in performing a work function, in this case digging. The implement 106 may include a boom 108 and a boom cylinder 110 used to raise and lower the boom 108. The implement 106 may also include a stick 112 that extends and retracts using a stick cylinder 114 and may further include a tool, such as a bucket 116, the that rotates using a bucket cylinder 118. In operation, the excavator 100 may use combinations of cylinder positions to engage the bucket 116 into a dig site to remove material and then to maneuver the bucket 116 to dump the material away from the dig site or into a dump truck or the like.

At a high level, the basic operations of the excavator 100 may include 'travel' using the tracks 104, 'dig,' and 'dump.' At a lower level, the excavator 100 may also perform functions including boom raise and lower, stick reach and pull, as well as bucket rotate in and bucket rotate out. Each of these operations may be accomplished by one or a combination of events, including tool events, direction events, gear events, and power events. The identification of events may include "raw channel" information, such as tool commands, ground speed, gear settings, engine speed, fuel burn rate, or tool position. This raw channel information may be supplemented by "derived channel" information such as developing power (e.g. drawbar pull) using, for example, a gear setting and engine speed. Derived channel information may also be used when certain raw channel information is not available such as tool position. For example, tool position may be derived by integrating raw tool commands over time and incorporating upper and lower limits for tool position. That is, a boom up command can be integrated over time to follow movement of the boom. However, because the boom up command may be held beyond the time the boom 108 reaches its maximum height, a saturation limit must be applied so that the calculated position does not track beyond the actual position.

Information from the raw channel or derived channel data may be used to determine certain true/false events, such as whether the tool is active or inactive or whether a tool is engaged or disengaged. To determine if a particular operation is being carried out, several true/false events such as "stick extended=true" and "tool active=true" may be evaluated in combination.

Each event may have its own condition and tolerances. For example, to determine whether a tool active event is true or false a current tool command may be compared against a predetermined active value in view of a tolerance for the tool command.

Other events can be developed using information such as cylinder position for the various hydraulic cylinders, cylinder pressures can be used to determine whether a tool is loaded or unloaded, and groundspeed calculations using engine revolutions per minute (RPM) and corresponding transmission or torque converter settings may be used to determine power events. Other observable conditions may be associated with these true/false events such as change of engine RPM, change in hydraulic cylinder position, change in cylinder pressure, etc.

Exemplary operations and events are illustrated in Table 1 and Table 2 below.

For example, when the excavator 100 is performing a traveling operation the associated conditions may include: the boom 108 up, the stick 112 in, implement controls 107 neutral, and the transmission in a high gear, such as gear 3 or above. In another example, when the excavator 100 is performing a dig operation a more complex set of conditions may be evaluated to automatically determine the dig operation. Several true/false events may be defined for the operation. For example, "tool active=true," "tool engaged=true," and "high load/power=true" may be sufficient to infer that a dig operation is occurring. Negative events, such as "direction forward=false" may also be used to infer operations.

In order to define an event as being true or false, a value for a condition may be defined, with a given tolerance for the condition. The tolerance may provide for some hysteresis so that the state changes are damped and so that when alternate conditions, such as tool engaged and tool disengaged, are both true, the machine operation classifier algorithm may be able to infer that the machine is in a transition state. For example, a tool active event may be identified when the boom 108 may be down more than 20% from its fully up position with a 5% tolerance, the stick 112 may be out more than 40% from its fully in position with a 5% tolerance, and the bucket 116 may be rotated more than 40% from its fully in position with a 10% tolerance. Once some defined set of initial conditions are met, subsequent changes in conditions may be evaluated to see if the boom 108 is adjusted up or down (i.e., tool active), the stick 112 is drawn in, or the bucket 116 is rotated in, that is, using a derivative of respective cylinder positions. Hydraulic pressures for the stick cylinder 114 and the bucket cylinder 118 may be monitored to watch for pressure increases associated with engaging a work surface 119.

Once instantaneous conditions for an operation are developed for a machine, such as the excavator 100, a computer programmed for the special function of developing a classification algorithm may be operated to generate the classification algorithm for a particular machine that classifies operations of the machine by evaluating the instantaneous conditions or the time series of conditions associated with that operation. The computer program that generates the algorithm is discussed in more detail below. One goal of the process is to select the minimum set of conditions and/or events required to identify an operation.

FIG. 2 illustrates a grader 120 having a motor 122, a steering wheel 124, blade control 126, a blade 130, a blade angle cylinder 132 and a height cylinder 134. The grader 120 may include steerable wheels 136. The grader 120 is configured to scrape and level a worksite 138 using the blade 130.

As with the excavator 100 above, the grader 120 may operate in several modes including a transport mode and a grading mode. The transport mode may be identified by conditions including groundspeed being above a certain threshold and the position of the height cylinder 134 being retracted beyond a threshold position. The grading mode may be identified by characteristics including blade position and drawbar pull, for example measured by strain gauges on the drawbar 140.

FIG. 3 illustrates a wheel loader 150 with a motor 152, operator control 154, a boom 156, boom cylinder 158, and bucket 160. The bucket 160 may be rotated between a load position and dump position via a bucket arm 162 and a corresponding bucket cylinder 164.

Operations of the wheel loader 150 may include moving to a load point, loading, moving to a dump point, dumping and scraping. Each may be characterized by events associated with that operation. For example, loading may be characterized by lowering the boom 156 beyond a percentage of full height, such as 50%, rotating the bucket 160 back within a percentage of fully up (or racked), such as 40%, and being engaged in forward motion. When this action is followed by retracting the bucket 160 to fully up and raising the boom 156, the load operation may be confirmed.

Dumping may also have a sequence of events that characterize the operation, such as raising the boom 156 and fully dumping the bucket 160, either at once or in stages. The ability to measure the bucket load improves the ability to identify operations in that a bucket full of material is indicative of having completed a load operation and an empty bucket is indicative of having completed a dump operation. Bucket load may be directly determined from a raw condition of the loader 150, such as a mass sensor (not depicted) on the boom 156. Alternatively, the bucket load determination may use a derived condition from other measurements such as boom cylinder pressure and bucket cylinder pressure.

One scraping operation may involve fully lowering the bucket 160 and lowering the boom 156 so that the bottom edge of the bucket 160 is nearly vertical to the work surface and then moving backward to level the work surface. By recognizing these conditions, the scraping operation may be identified.

Figure 4:
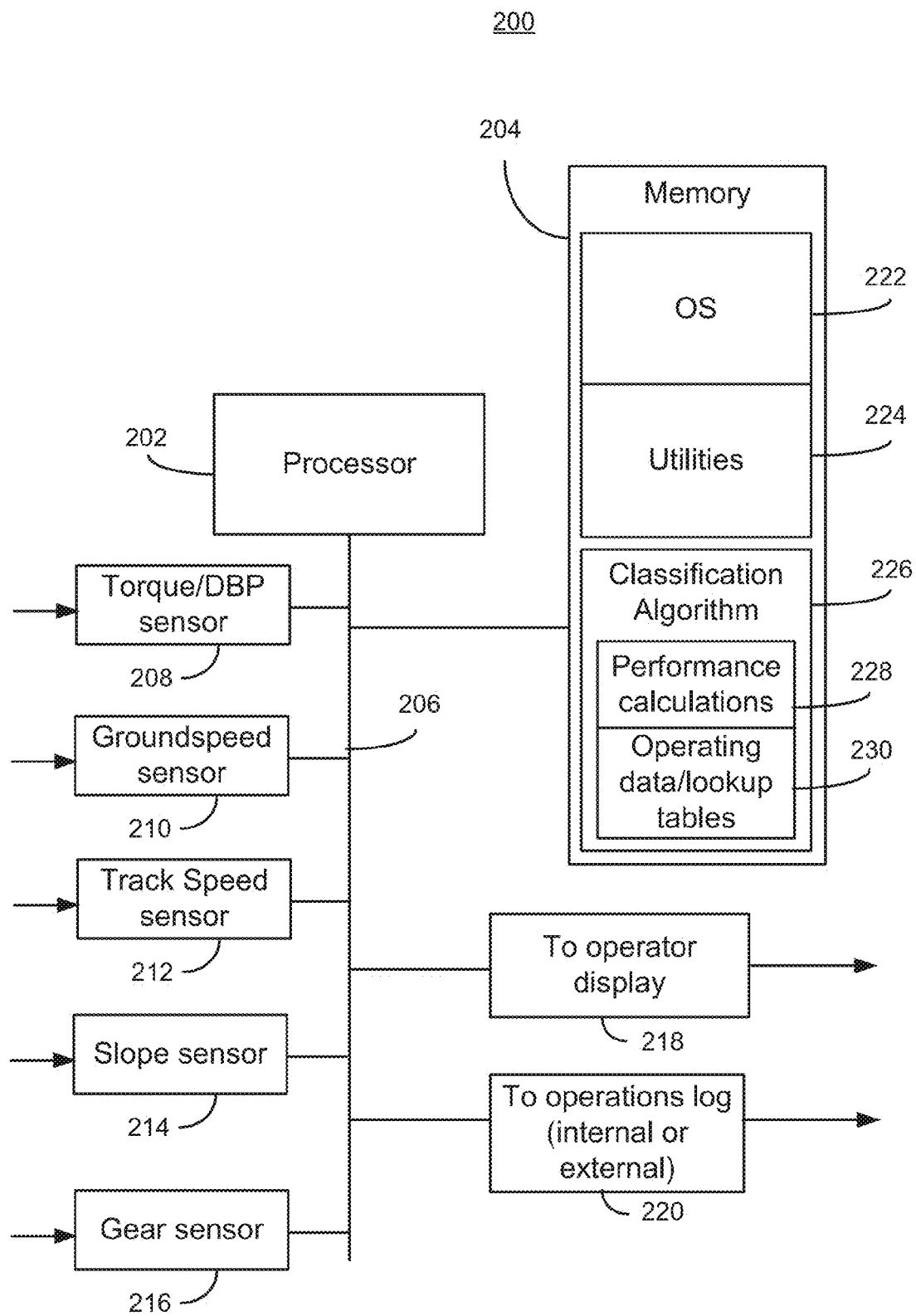
FIG. 4 is a block diagram of an exemplary controller for an off-road machine.

FIG. 4 illustrates a controller 200 that may be used in a machine, such as excavator 100 or any of the other machines discussed above, to execute a classification algorithm that identifies a machine operation based on observed conditions in the machine 100. Controller 200 may include a processor 202 coupled to a memory 204 via a data bus 206. Also connected to the data bus 206 may be a number of sensor inputs, that may include but is not limited to, a torque or drawbar pull sensor 208, a groundspeed sensor 210, a track speed sensor 212, a slope sensor 214, or a gear sensor 216. Also connected to the data bus 206 may be outputs such as a driver to provide information to an operator display 218 or an interface 220 to provide log data to an local device, such as a memory card, or via a network connection (not depicted) to an external device.

The memory 204 may be any of a number of physical hardware memories including separately or in combination hard disk drive, a solid-state memory, flash memory, removable storage media, or the like, but does not include propagated media such as carrier waves. The memory 204 may include an operating system 222 and associated utilities 224 used, for example, for set up and diagnostics. The memory 204 may also include the classification algorithm 226 that is executed by the processor 202 to collect data from the various inputs and generate a log of operations. The classification algorithm 226 may include performance calculations 228 such as those discussed above to identify certain events based on characteristics of the machine 100. The classification algorithm 226 may also include, among other routines, operating data and/or lookup tables 230 used to store available operations, events associated with each of the operations, and conditions associated with the various events.

Figure 5:
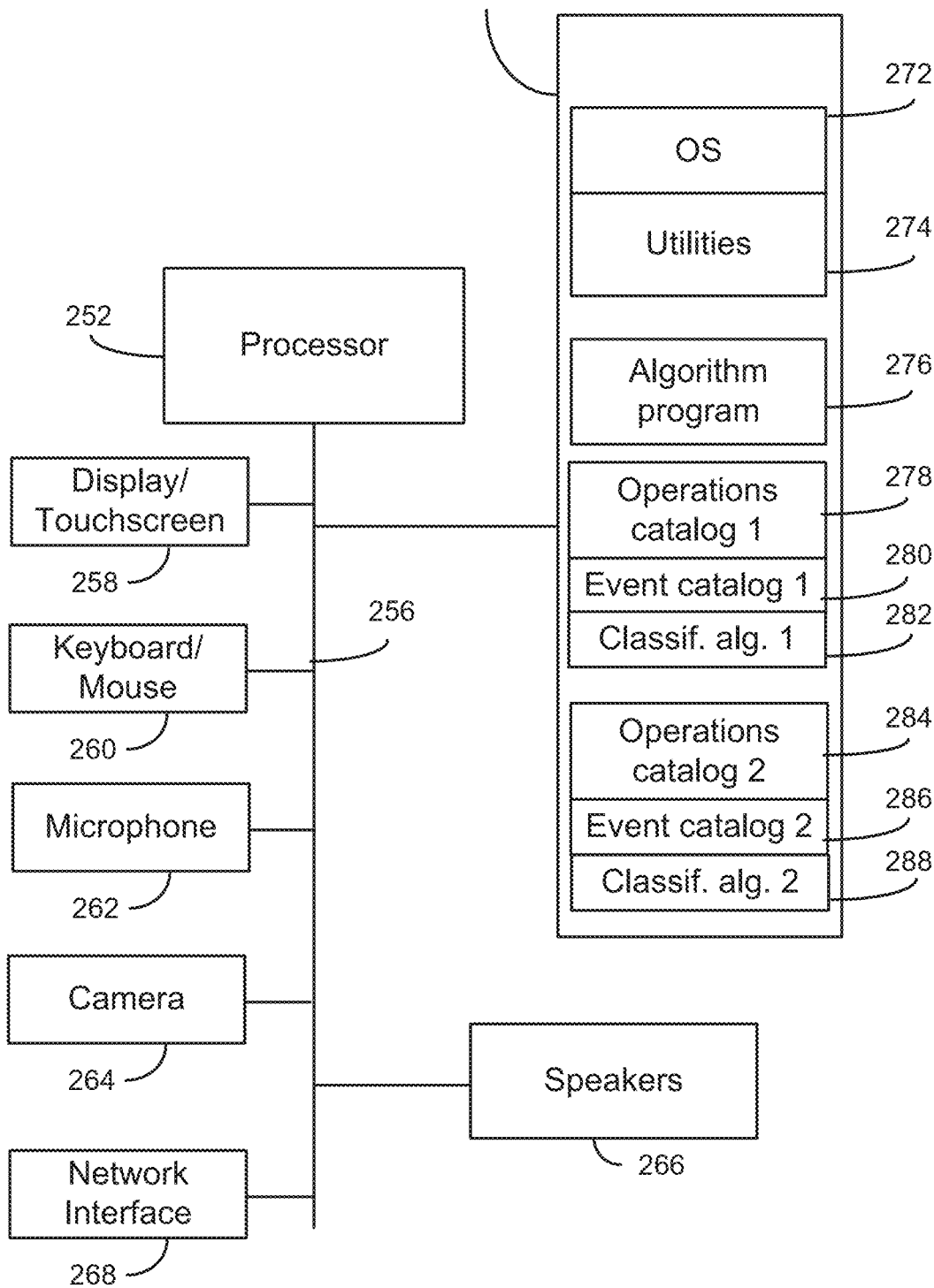
FIG. 5 is a block diagram of an exemplary computer adapted to generate machine operation classifier algorithms.

FIG. 5 illustrates a computer 250 that may include a processor 252 and a memory 254 coupled by a data bus 256. The computer 250 may include a variety of user interface elements including, but not limited to, a display or touch screen 258, a keyboard and/or mouse 260, a microphone 262, a camera 264, and speakers 266. The computer 250 may also include a network interface 268 used to communicate via a local or wide area network (not depicted). As above, the memory 254 may be any of a number of physical hardware memories including separately or in combination hard disk drive, a solid-state memory, flash memory, removable storage media, or the like, but does not include propagated media such as carrier waves.

The memory 254 may include an operating system 272 and utilities 274. The memory may also include an algorithm program 276 that receives input about operations of a machine as well as various events and associated conditions. The operation of the algorithm program 276 as discussed in more detail with respect to FIG. 6. Briefly, while the algorithm program 276 is executed by the processor 252 various inputs are received including a catalog of operations 278, a catalog of events 280 and their associated conditions, and a corresponding classification algorithm 282 is output in stored for use in a particular machine, such as machine 100. The algorithm program 276 may be used to generate multiple classification algorithms for various machines as illustrated by a second operations catalog 284, a second event catalog 286, and a second classification algorithm 288.

Figure 6:
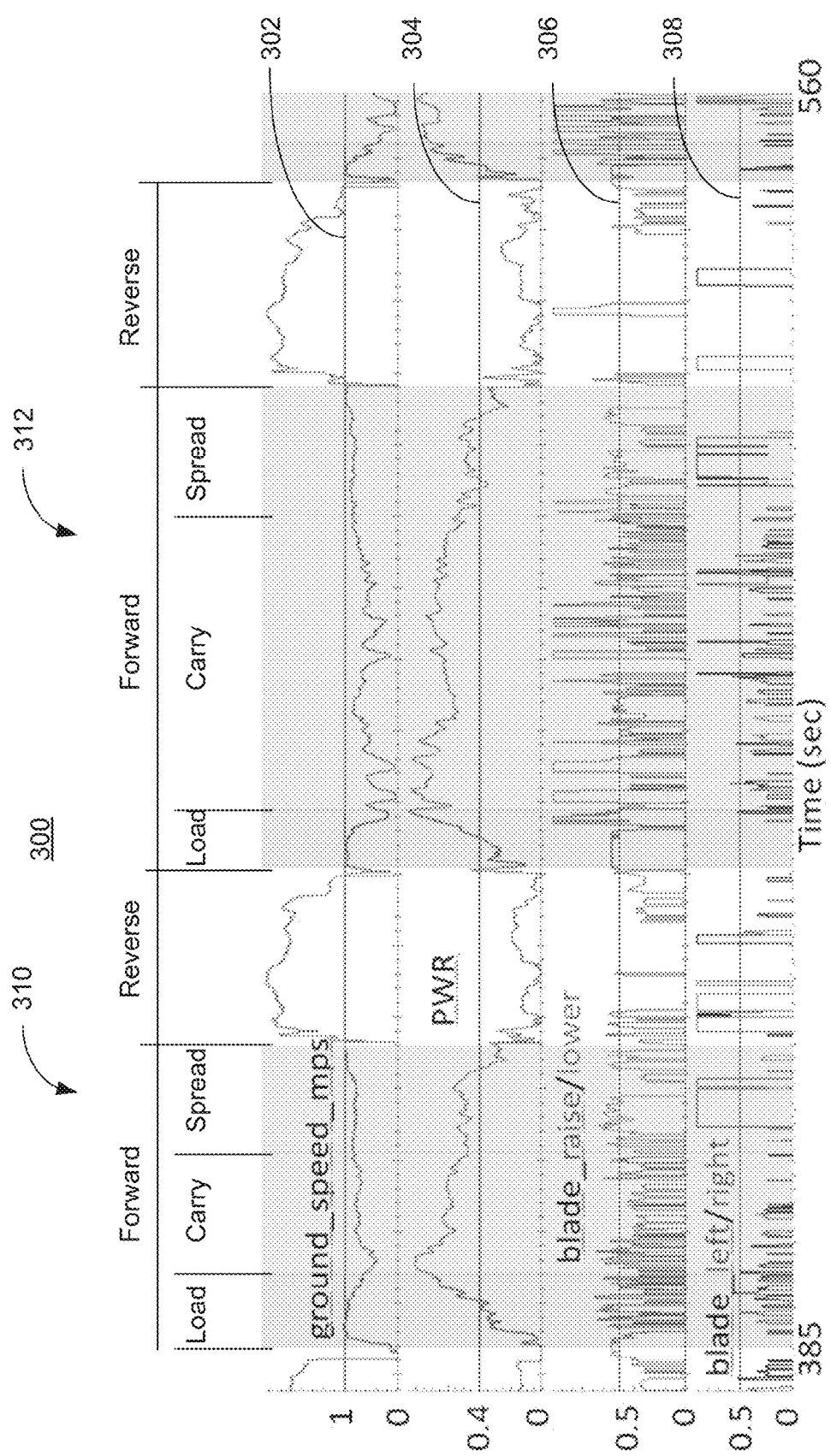
FIG. 6 illustrates an exemplary input chart for identification of events and operations.

FIG. 6 illustrates an exemplary input chart 300 for identification of events and operations. The chart 300 illustrates how a user may interface with the algorithm program 276 to identify characteristics associated with various operations so that the algorithm can generate the code necessary to identify and log the operations of interest. The chart 300 shows exemplary data collected over time for a bulldozer displayed in vertically arranged set. Other data sets may be used depending on the piece of equipment and the exact operations being characterized.

FIG. 6 shows four representative data series: ground speed, power (i.e., drawbar pull), blade raise (i.e., blade tool active), and blade angle (i.e., blade angle active).

A user may create a drop down list of the possible operations/segments for the particular machine, in this case, Load, Carry, Spread, and Reverse. Other machines may have different lists of possible operations. Next, the user may select one of the operations in the drop down list to let the system know which operation logic will be created. The user may then specify whether the parameter that is being specified should be a minimum or a maximum. Finally, the user may move the cursor over one of the time series plots and sees a dynamic horizontal line, e.g., line 302 for ground speed, line 304 for power, line 306 for blade raise, and line 308 for blade position. Each line 302, 304, 306, 308 may be separately selected and adjusted by dragging with a cursor. When the user has decided on the threshold value for a given channel, the user may click an input button to accept the location. The system may then record, for example, "Carry if PWR_alg>0.4" assuming minimum was previously selected. More interface options allow selection of "and" or "or" criteria to compose multiple logic conditions.

The user may also add labels 310 and 312 via the user interface that allow correlation of operations to the data series for ease of identification. Sample pseudo-code output associated with the completed process are shown below.

INDUSTRIAL APPLICABILITY

The ability to generate classification algorithms for various machines by capturing the operations the machine performs and events associated with each operation reduces the time and effort required to create classification algorithms and may also improve the quality of the classification algorithms by generating consistent code from a human readable set of inputs.

Figure 7:
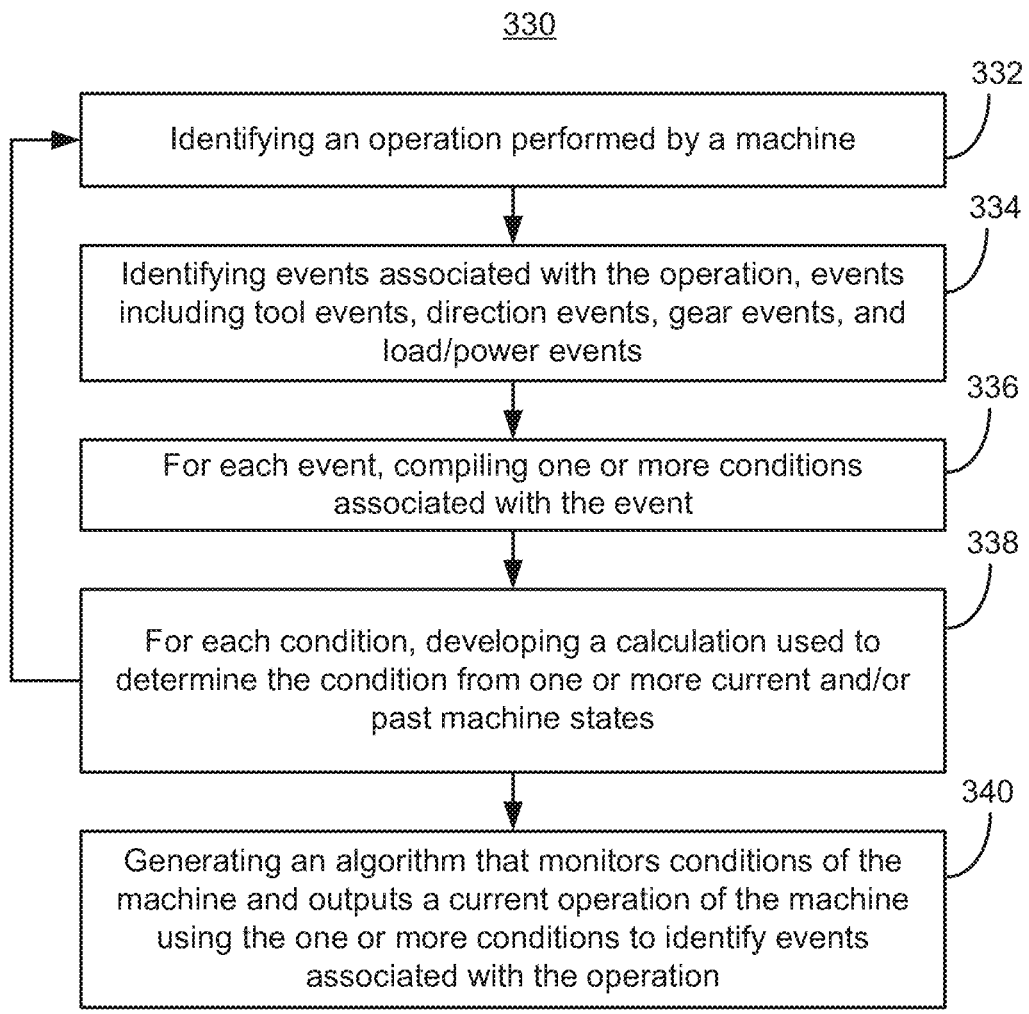
FIG. 7 is a flow chart of an exemplary method of generating machine operation classifier algorithms for a particular machine.

FIG. 7 is a flow chart of an exemplary method 330 of generating machine operation classified algorithms for a particular machine 100. At block 332 an operation performed by the machine 100 may be identified. A list of exemplary operations is depicted in Table 1 below. For example, dig, carry, and spread are typical of bulldozer operations where the blade digs material, carries the material to a point at the worksite, and spreads the material at the new location.

At block 334, events associated with the operation may be identified. The events may include tool events, direction events, gear events and load or power events. As discussed above, events may be true/false evaluations related to conditions in the machine 100. At block 336, for each event one or more conditions associated with that event may be identified. The condition may be defined as a function of raw data (see, e.g. Table 4 below) or may be a function of derived information, an example of which is shown in Table 3 below. Derived information may be calculated using one or more raw data elements.

At block 338 for each condition a calculation is developed that evaluates conditions in the machine for current and/or past machine conditions, whether raw or derived, and generates an output corresponding to the inferred operation being performed. In one embodiment, the calculation may be an actual calculation or may be a programmatic device such as case statements known in some programming languages.

For example, forward travel may be described in pseudo-code as

```
blade_tool_active == 0
AND
PWR < 0.2 OR steer_avg > 0.2
AND
ground_speed_mps > 0
``` where PWR is drawbar pull, steer_avg is steering average displacement, and groundspeed is in meters per second.

Similarly, the load operation of a bulldozer may be expressed in pseudo-code as:

```
ALWAYS (the following must always be true for the operation)
gear > 0 AND steer < 0.3 AND 0 < ground_speed_mps < 1.5
BEGIN IF (the following triggers the operation to start):
PWR_deriv > 0.02 OR eng_spd_deriv < −25
AND
PWR > 0.1 AND
blade_lower_flag > 0 AND
blade_tool_active == 1 AND
gear > 0 AND
steer_avg < 0.3
END IF (the following triggers the operation to stop)
PWR_deriv > 0.075
``` where steer is the steering angle and PWR_deriv is the first derivative of drawbar pull.

If additional operations are available to be included in the classification algorithm execution returned to block 332 and the process is repeated for the additional operation. If no more operations are to be included in the classification algorithm, execution may continue at block 340 where the classification algorithm 226 used for installation into the controller 200 of the machine 100 may be generated. The classification algorithm 226 may be stored in memory 254 of the computer 250 and transmitted to the machine 100 via the network interface 268 or may be transferred using a known removable memory, such as a flash drive.

Tables 1-4 illustrate representative values. The actual values for a particular machine may be less than shown or may have values not specifically illustrated here.

TABLE 1

| Operations |
| --- |
| Idle |
| Travel |
| Reverse |
| Dig/Load |
| Carry/Haul |
| Dump/Spread |
| Compact |
| Grade |
| Ditch |

TABLE 2

| Tool Events | Direction Events | Gear Events | Load/Power Events |
| --- | --- | --- | --- |
| Tool Active | Forward | High Gear | Low Load/Power |
| Tool Inactive | Stopped | Low Gear | High Load/Power |
| Tool Engaged | Reverse | Forward Gear | High Fuel Burn |
| Tool Disengaged |  | Reverse Gear | Low Fuel Burn |
| Specific Tool Position |  | Neutral |  |
| Tool High Pressure |  |  |  |
| Tool Low Pressure |  |  |  |

Note:
Events are True or False

TABLE 3

| Derived |
| --- |
| Integrated Tool Command Gives Tool/Cyl Position |
| Derivative of Cylinder Position |
| Derivative of Motor Position |
| Frequency of Tool Command |
| Drawbar-Pull |
| Pull-Weight Ratio |
| Normalized Drawbar-Pull |
| Normalized Tool Command (−1 to 1) |
| Machine Power |
| Tool Force |

TABLE 4

| Raw |
| --- |
| Cylinder Position |
| Motor Position |
| Tool Position |
| Tool Positve Command |
| Tool Negative Command |
| Tool Signed Command |
| Fuel Burn Rate |
| Tool Pressure |
| Signed Ground Speed |
| Ground Speed |
| Engine Speed |
| Transmission Input Speed |
| Gear |
| Transmission Gear Ratios |
| Fixed Drivetrain Ratios |

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A method of developing a machine operation classifier, the method comprising:
   i) identifying, via a user interface of a computer, an operation of a machine;
   ii) compiling, at the computer, a list of conditions that are associated with the operation of the machine, the step of compiling including compiling a list of true/false statements corresponding to one of tool events, direction events, gear events, and power events; and wherein the step of compiling the list of true/false statements for the tool events includes documenting a tool position value and tool position tolerance, the tool position value being a position of a tool and the tool position tolerance being a range of tool positions over which the tool is considered to be in a predetermined position;
   repeating, at the computer, steps i and ii for one or more operations that the machine is expected to perform; and
   generating, via the computer, a classifier algorithm, wherein the classifier algorithm outputs the operation of the machine selected from the identified operations of the machine in response to identification of conditions in the associated list of conditions when the classifier algorithm is executed on a processor of the machine, wherein the operation of the machine includes the operation of one of a construction machine, a mining machine, or an earthmoving machine.

2. The method of claim 1, wherein the operation of the machine is one of an idle operation, a travel operation, a reverse operation, a dig/load operation, a carry/haul operation, a dump/spread operation, a compact operation, a grade operation, and a ditch operation.

3. The method of claim 1, wherein the list of conditions include a raw condition and a derived condition.

4. The method of claim 1, wherein compiling the list of conditions includes documenting a tool command corresponding to a signal indicating an operator-initiated action for a tool.

5. The method of claim 4, wherein the tool is one of a blade, a bucket, a scraper, a ripper, and a payload bed.

6. The method of claim 1, wherein compiling the list of true/false statements for the tool events includes determining a tool position from a cylinder position.

7. A method of creating an operation classification algorithm for a machine, the method comprising:
  developing, at a computer, a catalog of operations performed by the machine;
  cataloging events associated with each of the operations, wherein the events include tool events, and each tool event is one of a tool active event, a tool inactive event, a tool engaged event, and a tool disengaged event, wherein the tool active event is derived from a tool command value and the tool engaged event is a function of a measured tool position and a derived tool position;
  for each event, documenting, via a user interface of a computer, one or more machine conditions associated with the event;
  for each machine condition, developing, at the computer, a calculation used to determine the one or more conditions from one of a current machine state or a combination of current and previous machine states; and
  generating a classification algorithm that monitors, in the machine, the one or more machine conditions and outputs a current operation of the machine using the one or more conditions to identity events associated with the operation.

8. The method of claim 7, wherein the operations performed by the machine include an idle operation, a travel operation, a reverse operation, a dig/load operation, a carry/haul operation, a dump/spread operation, a compact operation, a grade operation, and a ditch operation.

9. The method of claim 7, wherein the calculation is an integration of a tool position command with a high and low limit set at opposite range limits of a tool.

10. The method of claim 7, wherein generating the classification algorithm comprises developing a selection module that:
  monitors and stores the current machine state;
  develops one or more machine conditions from one or more machine states;
  identifies events from the current machine state or the combination of current and previous machine states; and
  selects an operation from the catalog of operations based on the events.

* * * * *